No. 809,160. PATENTED JAN. 2, 1906.
R. T. WINGO.
MECHANICAL MOVEMENT.
APPLICATION FILED MAY 31, 1905.

2 SHEETS—SHEET 1.

Witnesses:
James H. Thurston
Catherine G. Bradley

Inventor:
Richard T. Wingo,
by Wilmarth H. Thurston,
Attorney.

UNITED STATES PATENT OFFICE.

RICHARD T. WINGO, OF PROVIDENCE, RHODE ISLAND, ASSIGNOR TO BROWN AND SHARPE MANUFACTURING COMPANY, OF PROVIDENCE, RHODE ISLAND, A CORPORATION OF RHODE ISLAND.

MECHANICAL MOVEMENT.

No. 809,160.     Specification of Letters Patent.     Patented Jan. 2, 1906.

Application filed May 31, 1905. Serial No. 263,007.

*To all whom it may concern:*

Be it known that I, RICHARD T. WINGO, of Providence, in the county of Providence and State of Rhode Island, have invented certain new and useful Improvements in Mechanical Movements; and I do hereby declare the following specification, taken in connection with the accompanying drawings, forming a part of the same, to be a full, clear, and exact description thereof.

The invention relates to devices for insuring the proper timing and operation of an intermittently-operating clutch. These devices consist of a rotary member or members carried by the clutch and a non-rotary member or members movable into and out of the path of the rotary members. These members are so arranged and operated that in disengaging a non-rotary member from a rotary member to throw the clutch into operation a non-rotary member is moved into the path of a rotary member ready to throw the clutch out of operation, so that there is no danger of failure to throw out at the proper time or of operating improperly.

In the accompanying drawings mechanism is shown embodying the features of invention in their preferred forms.

Figure 1:
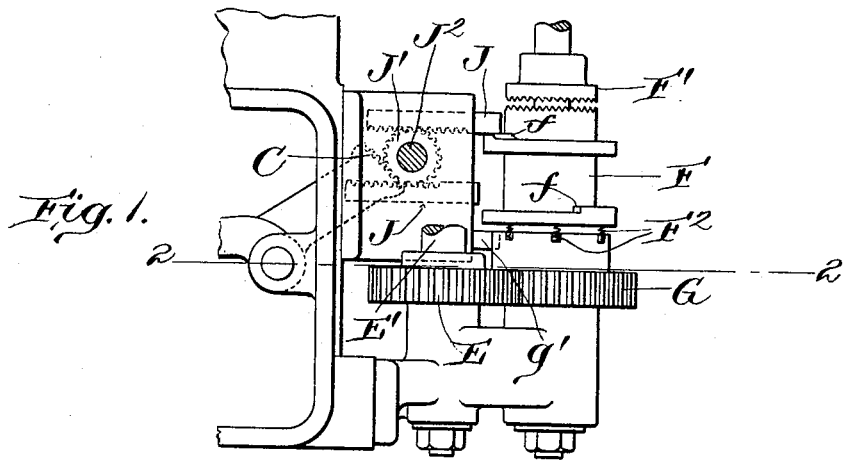
Figure 2:
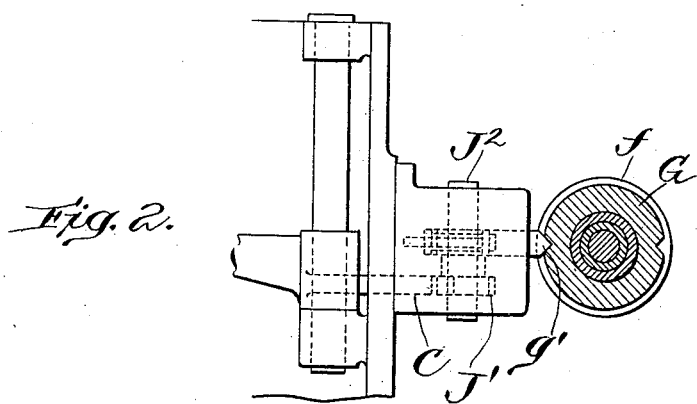
Figure 3:
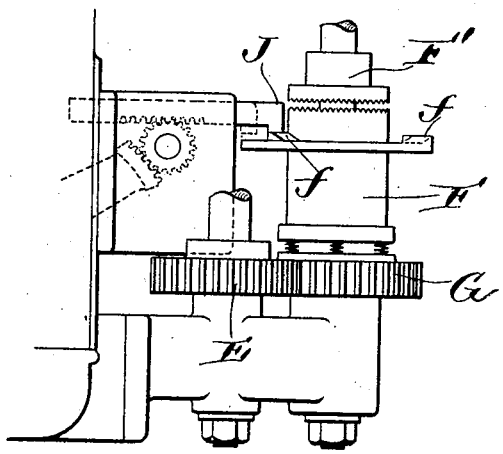
Figure 4:
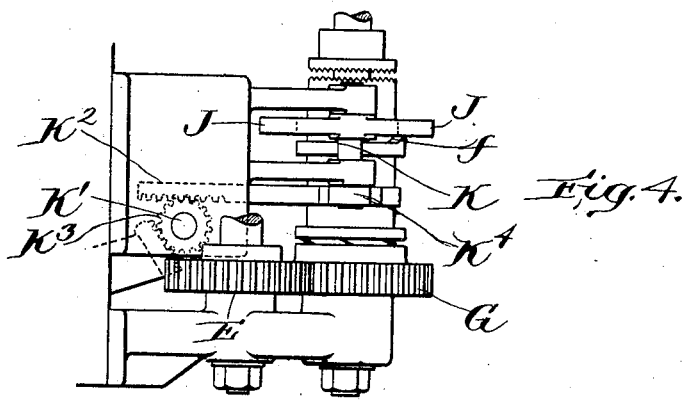
Figure 5:
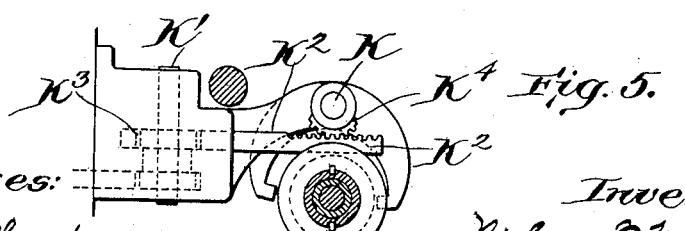

In the drawings, Figure 1 is a plan view of a mechanism embodying the invention. Fig. 2 is a sectional elevation on line 2 2 of Fig. 1. Fig. 3 is a plan view showing a modified form of mechanism; and Figs. 4 and 5 are a plan and elevation, respectively, of a further modification.

In the construction shown in the drawings the clutch F, the operation of which is to be controlled, is connected, through gears G and E, with a shaft E', which is intermittently rotated through the operation of the clutch. This shaft may be connected to operate or control any mechanism which it is desired to operate without danger of getting it out of time or of improper operation.

The clutch F is connected to rotate with the gear G, while being free to move longitudinally in relation thereto, and is forced toward a constantly-rotating clutch member F' by springs F², interposed between the clutch and the hub of the gear G. The clutch is held out of engagement with the clutch member F' against the tension of the springs F² by the coöperation of cams $f$, carried with the clutch and abutments J, movable into and out of the path of the cams. The cams $f$ are arranged on diametrically opposite sides of the clutch, since the arrangement shown is designed to throw the clutch out of operation after it has completed a half-revolution. The abutments J are arranged on the same side of the clutch and are in the form of plungers mounted to slide into and out of the path of the cam $f$. The plungers are so connected or operated that one of them moves into the path of a cam $f$ as the other is disengaged from the other cam $f$, and consequently there is always an abutment in the path of a cam ready to throw the clutch F out of engagement with the clutch member F'. There is no possibility therefore for the clutch to make more than a half-revolution or to get out of time with the devices which operate the plungers J.

The plungers J are connected so that the inward movement of one is accompanied by an outward movement of the other by means of a pinion J', which lies between the plungers and engages rack-teeth formed thereon. The pinion J' is secured to a short vertical shaft J², which may be rocked at the proper times to operate the plungers J through a segment C. When this shaft is rocked, to withdraw one of the plungers J from engagement with a cam $f$ and allow the clutch F to engage the rotating clutch member F' the other plunger J is advanced into the path of the other cam $f$, so that as the clutch completes a half-revolution this cam $f$ acts against the abutment J to disengage the clutch from the rotating clutch member. The clutch and gear G are held in position after each half-revolution by a spring-operated pin $g'$, having a V-shaped end arranged to engage notches in the hub of the gear.

In Fig. 3 a modified arrangement of the device for controlling the operation of the clutch F is shown. In this construction the clutch F is provided with two diametrically opposite cams $f$, arranged in the same transverse plane, but at different distances from the axis of the clutch. These two cams coöperate with a single plunger J, which moves into the path of one cam as it is moved to disengage it from the other cam. For instance, as the plunger J is retracted from the position shown in Fig. 3 to the position shown in dotted lines it disengages the cam $f$ which is nearer the axis of the clutch, thus allowing the clutch to move into engagement with the clutch member F', and at the same time moves into the path of the cam $f$ which is farther from the axis of the clutch, so that as the clutch completes a half-revolution this cam acts against the plunger to disengage the clutch from the clutch member F'.

In Figs. 4 and 5 another modified construction of the devices for controlling the clutch F is shown. In this construction there is a single cam $f$ connected with the clutch, and this cam coöperates with two abutments J, arranged on diametrically opposite sides of the clutch. These abutments are in the form of arms secured to a rock-shaft K, which is rocked to disengage one of the abutments from the cam $f$ and simultaneously move the other abutment into the path of the cam, so that the clutch is thrown out after making a half-revolution. The rock-shaft K is connected with a shaft K', corresponding to the shaft $J^2$ in Fig. 2, by a rack-bar $K^2$, one end of which is provided with teeth engaging a pinion $K^3$ on the shaft K' and the other end of which is provided with rack-teeth engaging a segment $K^4$, secured to the rock-shaft.

In all the different forms of device for controlling the operation of the clutch F the clutch is thrown into and out of operation by coöperating rotary and non-rotary members, and in each case whenever a non-rotary member is withdrawn from engagement with a rotary member a non-rotary member is simultaneously moved into the path of a rotary member, so that the act of throwing the clutch into operation sets the devices for throwing the clutch out of operation, and consequently the proper timing and operation of the clutch are positively insured. As indicated in the modifications shown, one or more non-rotary members may be employed or one or more rotary members, the result and mode of operation being in general the same with the different arrangements of the rotary and non-rotary members. It will also be understood that the parts may be constructed and arranged to secure the throwing out of the clutch after it has made a complete revolution or any desired fraction of a revolution.

What I claim, and desire to secure by Letters Patent, is—

1. The combination with a clutch, of rotary and non-rotary members coöperating to disengage said clutch and hold it out of operation, means for withdrawing a non-rotary member from engagement with a rotary member and simultaneously moving a non-rotary member into the path of a rotary member, substantially as described.

2. The combination with a clutch, of one or more cams, carried by the clutch, one or more abutments for coöperating therewith to hold the clutch out of operation, means for disengaging an abutment from a cam to release the clutch and simultaneously moving an abutment into position to throw the clutch out of operation, substantially as described.

3. The combination with a clutch, of one or more cams carried by the clutch, two abutments coöperating therewith to hold the clutch out of operation, connections between the abutments for moving one into the path of a cam as the other is disengaged from a cam, substantially as described.

4. The combination with a clutch, of a plurality of cams carried by the clutch, two abutments for coöperating therewith to hold the clutch out of operation, connections between the abutments for moving one into the path of the cam as the other is disengaged from a cam, substantially as described.

RICHARD T. WINGO.

Witnesses:
    J. H. THURSTON,
    W. H. THURSTON.